Oct. 20, 1970  E. BUSCH  3,535,033
MULTIPLE UNIT PROJECTION SYSTEM
Filed Jan. 11, 1968  4 Sheets-Sheet 1

INVENTOR
EDWIN BUSCH
BY his attorneys,
Learman, Learman & McCulloch

INVENTOR
EDWIN BUSCH

Oct. 20, 1970    E. BUSCH    3,535,033
MULTIPLE UNIT PROJECTION SYSTEM
Filed Jan. 11, 1968    4 Sheets-Sheet 3
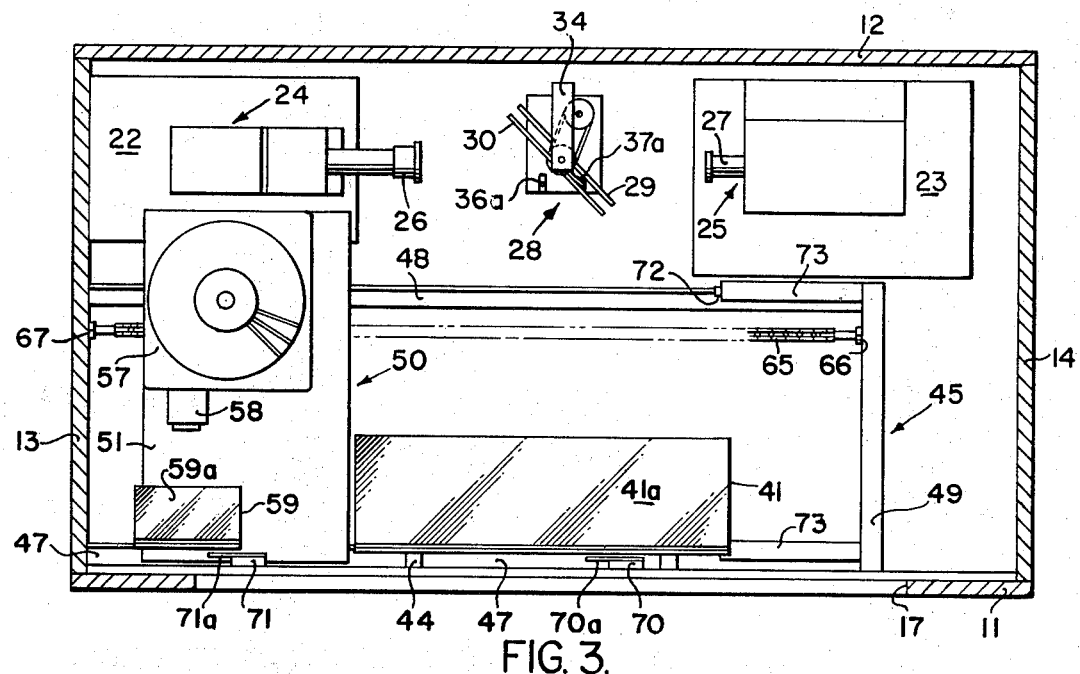
INVENTOR
EDWIN BUSCH
BY his attorneys
Learman, Learman & McCulloch

United States Patent Office 3,535,033
Patented Oct. 20, 1970

3,535,033
MULTIPLE UNIT PROJECTION SYSTEM
Edwin Busch, 49 Davis Drive, Saginaw, Mich. 48602
Filed Jan. 11, 1968, Ser. No. 697,201
Int. Cl. G03b 21/26
U.S. Cl. 353—94                                10 Claims

ABSTRACT OF THE DISCLOSURE

A self-contained, multiple film and slide projector system wherein an enclosed housing includes: A front side translucent screen on the inner face of which an image is projected so that it is transmitted through to the outer face; confronting projectors are provided in the housing on opposite sides of a mirror assembly, a removable carriage, provided with still another projector and a mirror, is movable to and from image transmitting position; a motor is provided for moving the mirror assembly selectively to positions in which it will transmit images from only one of the confronting projectors; a second motor is provided for moving the carriage, and an electrical control system is provided which moves the mirror assembly at the time one of the confronting projectors is started or moves the carriage to a transmitting position at the time the carriage projector is started.

---

One of the prime objects of the invention is to provide a self-contained projector system capable of transmitting images selectively from one of a plurality of projection units which are provided within a housing having a rear projection screen.

A further object of the invention is provide a highly automated, self-contained projection system wherein remotely located controls provide for starting one of a plurality of projectors and shifting a mirror assembly substantially simultaneously to transmit the image to a rear projection screen.

Still another object of the invention is to provide a mobile, self-contained projection system of highly reliable character permitting the selective operation of as many as three projectors in a compact system which can be economically manufactured for sale to educational systems and industry in general.

Other objects and advantages of the invention will be pointed out specifically or will become apparent from the following description when it is considered in conjunction with the appended claims and the accompanying drawings, in which:

FIG. 3 is a sectional plan view taken on the line 3—3 of FIG. 1;

FIG. 4 is an enlarged, fragmentary plan view illustrating switch mechanism for stopping an image transmitting mirror assembly in alternate positions of use;

FIG. 5 is an enlarged, elevational view thereof; and

Figure 1:
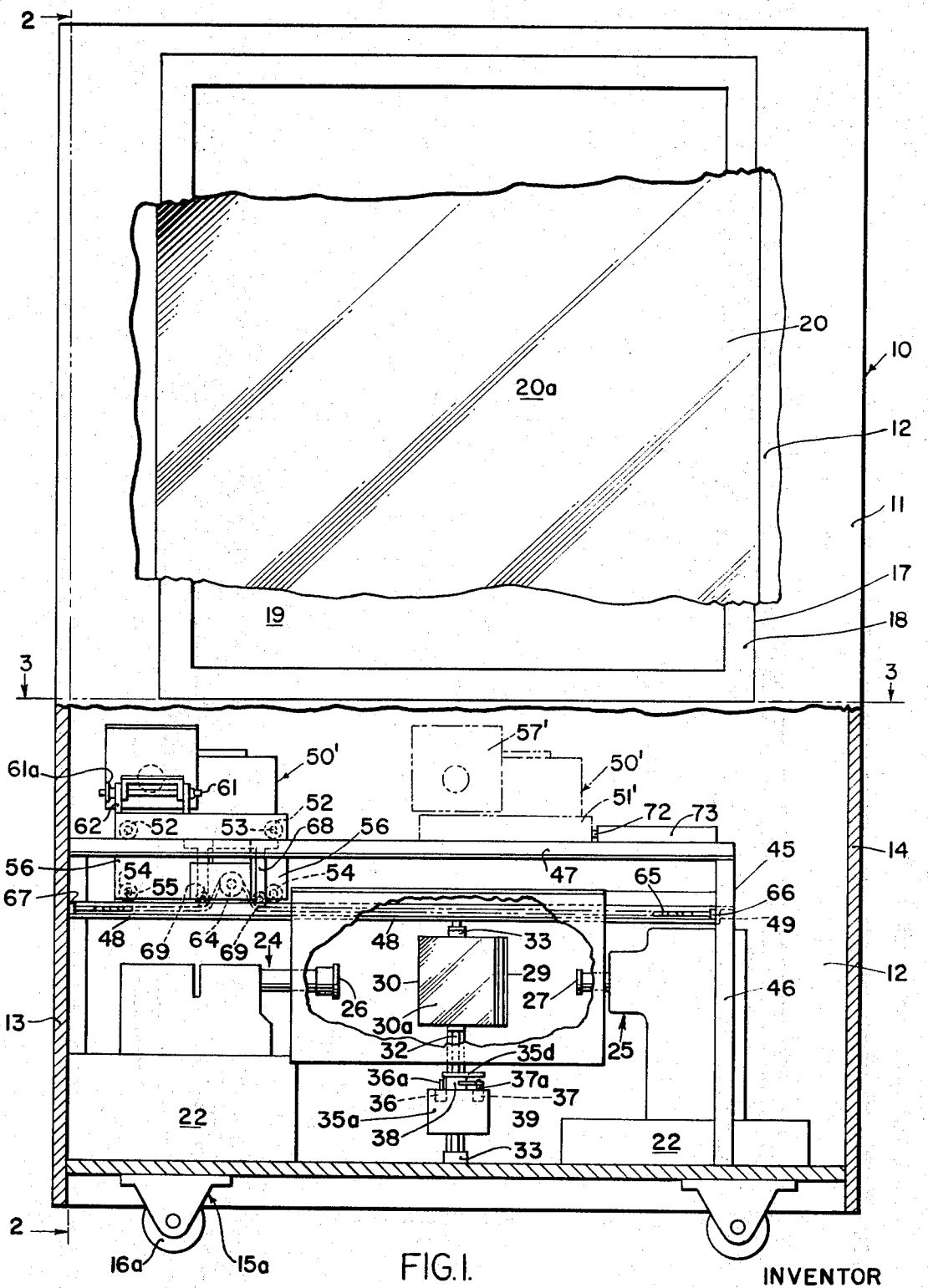
FIG. 1 is a front elevational view of my mobile projection system with portions of the cabinetry or housing broken away to expose the interior thereof.

Referring now more particularly to the accompanying drawings in which a preferred embodiment of the invention only has been illustrated, a numeral 10 generally indicates a cabinet or housing for the system comprising front and rear walls 11 and 12, respectively, side walls 13 and 14, a top wall 15, and a bottom wall 16. Caster assemblies generally designated 15a and having wheels 16a support the cabinet 10 for convenient travel to and from lecture halls, classrooms, and the like. The system to be described is what may be termed a self-contained rear projection system in the sense that the front wall 11 is provided with an opening 17 receiving a rectilinear frame 18 which mounts a translucent projection screen 19 upon the inner face of which the picture is projected in the usual manner. A plastic rear projection screen of this type is, for example, illustrated in my copending application entitled Film Projection Apparatus, filed in the United States Patent Office Feb. 9, 1966, under Ser. No. 526,215. As in that application, a mirror 20 having a reflective surface 20a and supported by a stationary frame 21 from the side walls 13 and 14 of the housing relays the picture or image to the rear face of the screen 19. As has has been indicated, the mirror 20 will selectively receive an image or picture from a variety of projection equipment mounted within the cabinet 10 and which will now be described.

Mounted in stationary position in the rear portion of the cabinet 10 are a pair of spaced apart bases or pedestals 22 and 23, respectively (see FIGS. 1 and 3), which respectively support a conventional film strip projector generally designated 24 and a conventional movie projector generally designated 25. The projector 24 may be the conventional 35 mm. film strip projector, such as the Standard 750 Strip Projector, manufactured by Standard Projectors Inc., of Chicago, Ill., which is mounted in fixed position on the pedestal 22 and includes a projecting lens housing 26 in the usual manner. The projector 25 may be the conventional 16 mm. sound movie projector manufactured by Eastman Kodak Co., of Rochester, N.Y., and similarly has a projecting lens housing 27.

Mounted between the lens housings 26 and 27 is a pivotal mirror assembly generally designated 28 (see particularly FIGS. 3 and 4) which includes a pair of spaced apart mirrors 29 and 30 having reflective surfaces 29a and 30a. The mirrors 29 and 30 are secured to a support block 31 mounted on a vertical shaft 32 journaled in bearings 33 supported by a frame 34. A reversible electric motor 35 provided in a motor housing 35a drives the shaft 32 through pulleys 35b and 35c and a belt 35d. The motor 35 is a conventional reversible electric motor which is capable of driving the shaft 32 in opposite directions of rotation.

As FIGS. 1 and 4 particularly indicate, each of a pair of motor stopping switches 36 and 37 provided in housing 35a has an upwardly extending actuator finger 36a and 37a, respectively, and fixed on the shaft 32 is a collar 38 having a pair of switch actuating fingers 39 and 40 provided thereon which are adapted to engage the limit switch actuator fingers 36a and 37a, respectively, to stop the rotation of shaft 32 and locate the mirrors 29 and 30 in either the position shown in FIG. 3 or the position shown in FIG. 4.

Figure 2:
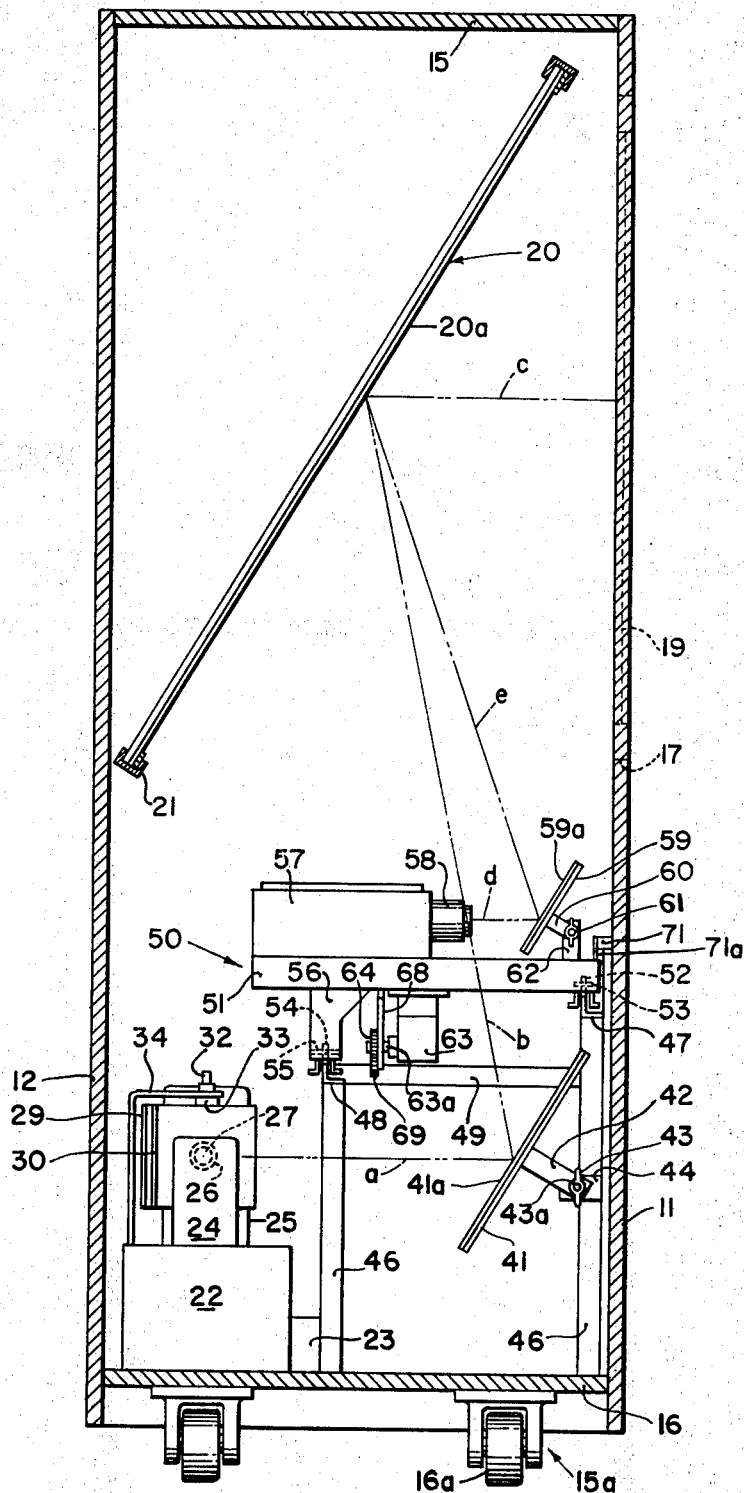
FIG. 2 is a transverse sectional view taken on the line 2—2 of FIG. 1.

When the mirror assembly 28 is in the position in which it is shown in FIG. 3 it is in position to transmit an image projected by the lens system 26 of film strip projector 24 to a mirror 41 having a reflective surface 41a which is supported by arms 42 on a shaft 43 provided on a support block 44 (see FIG. 2). The shaft end 43 is preferably threaded so that a thumb screw 43a or the like may be tightened down to thereby permit the mirror 41 to be fixed in a particular vertically inclined position. As FIG. 2 indicates, the image projected as at $a$ to the mirror 41 is relayed by the mirror 41 as at $b$ to the mirror 20, from whence it is reflected by the mirror 20 along an image projecting path as at $c$ to the rear face of screen 19. When the mirror assembly 28 is in the position in which it is shown in FIG. 4, it is the movie projector 25 which transmits the image to the mirror surface 29a, which relays it to the mirror 41 from which it is in turn transmitted to the mirror 20 in the same manner.

Mounted in the front of the projection cabinet 10 is a fixed framework generally designated 45 comprising front and rear vertical members 46 supporting vertically spaced front and rear angle members 47 and 48 and end members 49. The members 47 and 48 form tracks supporting a carriage generally designated 50 for movement horizontally from the full line position shown in FIG. 1 to the position indicated by the chain lines 50' in FIG. 1. As FIG. 2 particularly indicates, the carriage 50 includes a platform 51 mounting rollers 52 on shafts 53 at its front end and rollers 54 on shafts 55 supported by a plate 56 at its rear end. The rollers 52 and 54 support the carriage 50 for movement on the tracks 47 and 48, respectively.

Supported on the platform 51 is a conventional 35 mm. slide projector 57 which, for instance, could be the Carousel projector manufactured by Eastman Kodak Company of Rochester, N.Y., which has a projecting lens housing 58. Also mounted on the plateform 51 in centered position with respect to the lens housing 58 is a mirror 59 having a reflective surface 59a, as shown, for transmitting the image d received from the projector 57 to the mirror 20 as at e, when the carriage 50 and projector 57 are in the positions 50' and 57' shown in FIG. 1. The mirror 59 may be supported by arms 60 from a shaft 61 which is pivotally mounted on supports 62 fixed to the platform 51 and, like the shaft 43, may be threaded to receive a thumbscrew 61a or the like for fixing the mirror 59 in various tilted positions.

Mounted on the underside of carriage 51 is a motor 63 having an armature shaft 63a on which a sprocket 64 is fixed. The sprocket 64 is provided in driving engagement with a length of chain 65 which is secured, as shown in FIGS. 1 and 3, to the framework 45 and wall 13 as at 66 and 67. Arm members 68 depending from the platform 51 support idler sprockets 69, as shown, on either side of the sprocket 64. The motor 63 is another reversible motor for driving the sprocket 64 in either direction and moving the carriage 50 and projector 57 supported thereby to and from a centered position in which it is in proper focal alignment with the mirror 20. Provided to stop the motor 63 are limit switches 70 and 71 which respectively have actuator arms 70a and 71a. Provided to postively halt the carriage 50 in the position 50' are rubber bumpers 72 carried by support members 73, as shown, mounted on rails 47 and 48.

Figure 6:
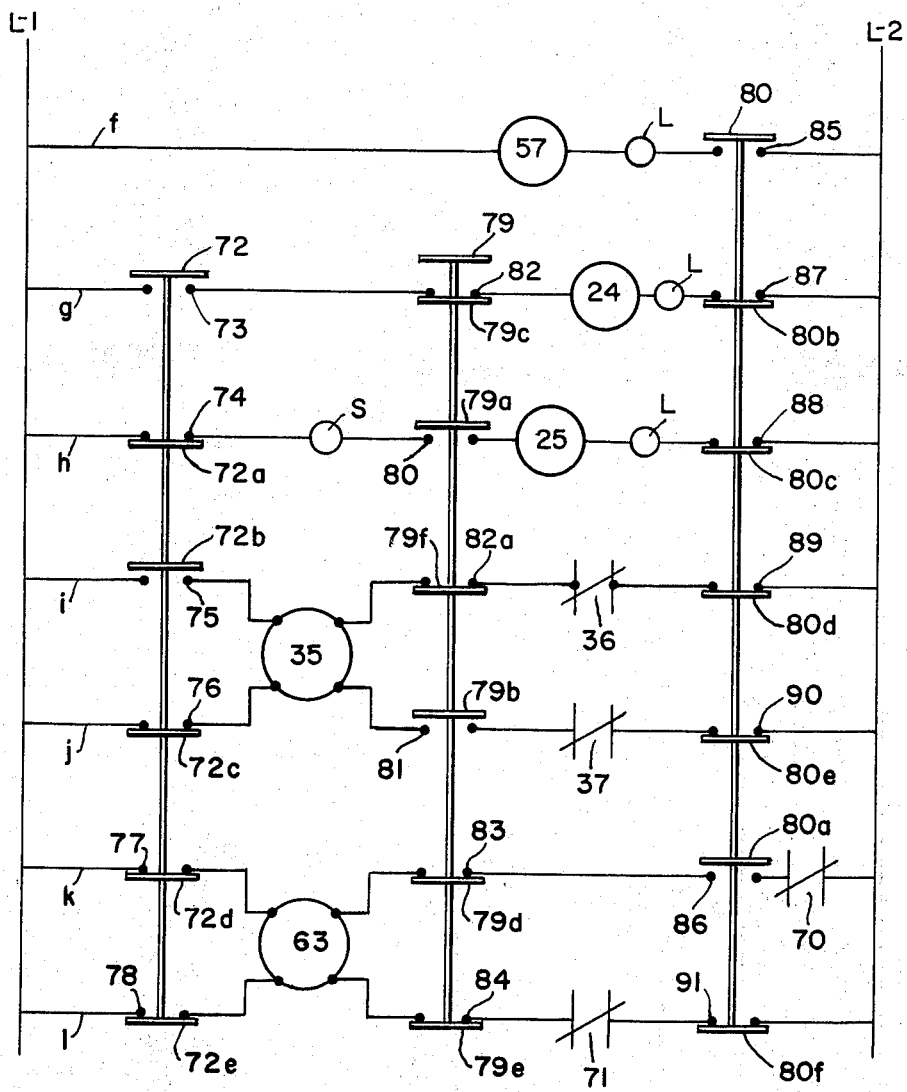
FIG. 6 is a schematic representation of a typical electrical control system.

In FIG. 6 I have schematically shown an electrical control system which could be employed and wherein a plurality of circuit wires f–1 are provided, bridging line wires L–1 and L–2. Start buttons are employed in the system for starting the motor of each of the projector units 24, 25, and 57, and also selectively operate motors 35 and 63 in a manner to transmit the image desired from the particular projector which is being operated. In the diagram, FIG. 6, the motors for the projector units 24, 25, and 57 are shown at 24, 25, and 57 in the circuit lines g, h and f, respectively. The circuit line i is the circuit for motor 35 which caused it to drive mirror assembly 28 in a counterclockwise direction in FIG. 3, and the circuit line j is the reversing circuit which drives the mirror assembly 28 in a clockwise direction. Circuit line k is the circuit for motor 63 that drives the motor 63 in a direction to move the carriage 50 to the position 50', and circuit line l in FIG. 6 is the reversing circuit for motor 63 which drives the motor 63 in a direction to return the carriage.

Preferably, the push buttons for operating the various elements are mounted on the outer face of one of the side walls of the cabinet 10 in an easily accessible position, but it should be understood that they may also be mounted remotely from the cabinet 10 on a lectern base or the like. The push button 72 for closing terminals 73 and starting projector motor 24 includes also a bridge 72a for normally closing terminals 74 in circuit line h, a bridge 72b for closing terminals 75 in circuit line i when the button 72 is depressed, a bridge 72c for normally closing the terminals 76 in circuit line j, a bridge 72d for normally closing the terminals 77 in circuit line k, and a bridge 72e for normally closing the terminals 78 in circuit line l. Thus, when the push button 72 is pressed downwardly to close terminals 73, terminals 75 are also closed but terminals 74, 76, 77, and 78 are opened. Accordingly, only circuit lines g and circuit lines i will be closed and only motors 24 and 35 can be driven. Thus, at the time projector motor 24 is started, motor 35 is operated to move mirror assembly 28 to the position in which it is shown in FIG. 3.

When push button 79 is depressed sufficiently so that the bridge 79a makes terminals 80 in circuit line h and a bridge 79b makes terminals 81 in circuit line j, the projector motor 25 and reversing circuit j of motor 35 are energized simultaneously. This causes motor 35 to drive the mirror assembly 28 to move it from the position shown in FIG. 3 to the position shown in FIG. 4. At this time a bridge 79c which normally bridges terminal 82 opens circuit line g, a bridge 79f which normally bridges terminals 82a opens circuit line h, a bridge 79d normally bridges terminals 83 opens circuit line k, and a bridge 79e which normally bridges terminals 84 opens circuit line l.

A third push button 80 which, when depressed, closes terminals 85 in circuit line f, has a bridge 80a at the same time closing terminals 86 in circuit line k to move the carriage 50 from a position in which the mirror 59 is substantially out of reflecting alignment with the mirror 20 to the position 50' shown in FIG. 1. When this occurs the bridge 80b normally bridging terminals 87 opens circuit line g, the bridge 80c normally bridging terminals 88 opens circuit line h, the bridge 80d normally bridging terminal 89 opens circuit line i, the bridge 80e normally bridging terminals 90 opens circuit line j, and the bridge 80f normally bridging terminals 91 opens circuit line l. When push button 80 is restored to open position, the circuit l is closed and the carriage 50 is restored to the position in which it is shown in solid lines in FIG. 1. The lamps L in each circuit f, g, and h are the lamps for each of the projectors 57, 24, and 25 and in the case of projector 25 a switch S for turning on the sound is also incorporated.

It is to be understood that the system may also incorporate push button operated motors for focusing any or all of the three projectors which has been shown and a push button started and stopped tape recorder. Further, the system may incorporate a push button for controlling the sound unit in the sound movie projector so that the projector may be operated either with or without sound and may also incorporate a microphone and reverse buttons for reversing any of the projector motors 24, 25, or 57 at will. The rear projection screen frame 17 may also be moved so that the mirror 20 can reflect to a translucent rear projection screen located a distance ahead of cabinet 11.

It is to be understood that the drawings and descriptive matter are in all cases to be interpreted as merely illustrative of the principles of the invention rather than as limiting the same in any way, since it is contemplated that various changes may be made in the various elements to achieve like results without departing from the sipirt of the invention or the scope of the appended claims.

I claim:

1. In a multiple projection unit system: housing means; a translucent screen on the inner face of which an image is projected so that it is transmited through to the outer face thereof; a plurality of projector units in said housing adapted to be operatively connected with a source of power for selectively projecting an image to said screen; mirror means movable to different positions to selectively reflect images from selected ones of said units to said inner face of the screen; and control means for selectively operating said selected ones of said projector units and for shifting said mirror means including: separate switch means for connecting each of said selected ones of said projector units with said source of power to operate said selected units, and means for substantially simultaneously automatically shifting said movable mirror means in a particular direction dependent on which unit is operated.

2. The combination defined in claim 1 in which said selected ones of said projector units are disposed in confronting position with their lens housings substantially aligned; and said mirror means includes pivotal mirror means mounted between said lens housings for pivotal movements about a vertical axis.

3. The combination defined in claim 2 in which said mirror means also includes an upwardly inclined mirror horizontally opposite said pivotal mirror means on the screen side of the housing means; and a downwardly inclined mirror spaced from and in generally horizontal alignment with said screen opposite the screen of the housing means.

4. A multiple unit projection system for transmitting images to a screen comprising; a frame; a plurality of projector means positioned on said frame for selectively projecting an image along a common image projecting path to said screen, each of said projector means including projector operating drive means adapted to be operatively connected with a source of power; a first one of said projector means being movable between a remote, inoperative position and an operative, image projecting position; mirror means including means movable with said one of said first projection means for reflecting images from said first projector means along said common image projecting path when said first projector means is in its image projecting position; and means for shifting said first projector means and movable reflecting means between said remote inoperative position and said image projecting position.

5. The combination defined in claim 15 in which said mirror means includes an additional mirror inclined to the common image projecting path and spaced from and generally in alignment with said screen; said first projector means being movable from a position in which said movable reflecting means is substantially out of reflecting alignment with said additional mirror to a substantially central position in which it is so aligned so that an image emanating from said first projector means is reflected by said movable mirror means to said addition mirror which in turn transmits it to said screen.

6. The combination defined in claim 5 in which an additional projector unit is provided in said housing means in alignment with still additional mirror means for transferring an image to said additional mirror means.

7. The combination defined in claim 5 in which a pair of additional projector units are provided in said housing means on opposite sides of a mirror assembly comprising a pair of mirrors with oppositely disposed mirror surfaces mounted for pivotal movement between said pair of units.

8. A multiple projection unit system as set forth in claim 4 including second mirror means movable to different positions to selectively reflect images from other selectively operable projector means of said plurality thereof, to said screen along said common image projecting path; and means for selectively operating selected ones of said other projector means and selectively moving said second mirror means.

9. The combination defined in claim 8 wherein said means for selectively operating includes switch means for selectively connecting said other projector means with said source of power to selectively operate said other projector means; and means for automatically shifting said first projector means between operative and inoperative positions when one of said other projector means is operated.

10. In a multiple projection unit system: a frame; a plurality of projector units mounted on said frame and adapted to be operatively connected with a source of power for selectively projecting an image to a screen along a common image projecting path; mirror means movable to different positions to selectively reflect images from selected ones of said units to said screen; and control means for selectively operating said selected ones of said projector units and for shifting said mirror means including: means for selectively connecting selected ones of said projector units with said source of power to operate said selected units, and means for substantially automatically shifting said movable minor means if it is not in a position to reflect an image from the projector unit to be operated along said path to an operative image reflecting position.

References Cited

UNITED STATES PATENTS

| 2,031,361 | 2/1936 | Bowen | 353—34 |
| 2,727,429 | 12/1955 | Jenkins | 352—89 |
| 3,040,622 | 6/1962 | Reddle et al. | 353—78 |
| 3,051,040 | 8/1962 | Davis | 353—73 |
| 3,283,652 | 11/1966 | Busch | 353—94 |
| 3,288,549 | 11/1966 | Bottani | 353—94 |
| 3,293,807 | 12/1966 | Ramsell | 353—78 |

FOREIGN PATENTS 348,527  2/1922  Germany.

HARRY N. HAROIAN, Primary Examiner

U.S. Cl. X.R.

353—78, 99